(12) United States Patent
Jiang

(10) Patent No.: US 12,430,398 B2
(45) Date of Patent: Sep. 30, 2025

(54) SYSTEMS AND METHODS FOR QUANTUM TOMOGRAPHY USING AN ANCILLA

(71) Applicant: Google LLC, Mountain View, CA (US)

(72) Inventor: Zhang Jiang, El Segundo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/150,859

(22) Filed: Jan. 6, 2023

(65) Prior Publication Data

US 2023/0205840 A1    Jun. 29, 2023

Related U.S. Application Data

(63) Continuation of application No. 17/071,316, filed on Oct. 15, 2020, now Pat. No. 11,550,872.

(60) Provisional application No. 62/915,246, filed on Oct. 15, 2019.

(51) Int. Cl.
*G06F 17/16*    (2006.01)
*G06N 10/00*    (2022.01)

(52) U.S. Cl.
CPC ............. *G06F 17/16* (2013.01); *G06N 10/00* (2019.01)

(58) Field of Classification Search
CPC ........ G06F 17/16; G06N 10/00; G06N 10/40; G06N 10/20
USPC ......................................................... 708/520
See application file for complete search history.

(56) References Cited

U.S. PATENT DOCUMENTS

| | | | |
|---|---|---|---|
| 2018/0053112 A1* | 2/2018 | Bravyi | G06F 30/392 |
| 2019/0095811 A1* | 3/2019 | Antonio | G06N 10/00 |
| 2019/0378047 A1* | 12/2019 | Pistoia | G06F 17/14 |
| 2020/0057957 A1 | 2/2020 | Johnson et al. | |
| 2021/0255856 A1* | 8/2021 | Cao | G06N 10/00 |

FOREIGN PATENT DOCUMENTS

WO    WO-2020131798 A1 *    6/2020    ............. G06F 15/16

OTHER PUBLICATIONS

Vlasov, Clifford algebras, Spin groups and qubits trees, Apr. 22, 2019, arXiv:1904.09912v1 [quant-ph], pp. 1-29. (Year: 2019).*
Babbush et al., "Low-Depth Quantum Simulation of Materials," Physical Review, vol. 8, 2018, 40 pages.
(Continued)

*Primary Examiner* — Michael D. Yaary
(74) *Attorney, Agent, or Firm* — DORITY & MANNING P.A.

(57) ABSTRACT

Quantum computing systems and methods are provided. In one example, a quantum computing system includes a quantum system having one or more quantum system qubits and one or more ancilla qubits. The quantum computing system includes one or more quantum gates implemented by the quantum computing system. The quantum gate(s) are operable to configure the one or more ancilla qubits into a known state. The quantum computing system includes a quantum measurement circuit operable to perform a plurality of measurements on the one or more quantum system qubits using the one or more ancilla qubits. The quantum computing system includes one or more processors operable to determine a reduced density matrix for a subset of the quantum system based on a set of the plurality of measurements that include a number of repeated measurements performed using the quantum measurement circuit.

17 Claims, 7 Drawing Sheets

(56) References Cited

OTHER PUBLICATIONS

Bonet-Monroig et al., "Nearly Optimal Measurement Scheduling for Partial Tomography of Quantum States," arXiv:1908v2, Sep. 6, 2019, 9 pages.
Bravyi et al., "Fermionic Quantum Computation," Annals of Physics, vol. 298, 2002, pp. 210-226.
Cirac et al., "Quantum Computations with Cold Trapped Ions," Physical Review Letters, vol. 74, May 15, 1995, pp. 4091-4094.
Cotler et al., "Quantum Overlapping Tomography," arXiv:1908v2, Aug. 22, 2019, 8 pages.
Dang et al., "Linear Dependencies in Weyl-Heisenberg Orbits," Quantum Information Processing 12, 2013, 27 pages.
Devoret et al., "Superconducting Qubits: A Short Review," arXiv:0411174v1, Nov. 7, 2004, 41 pages.
Feynman, "Simulating Physics with Computers," International Journal of Theoretical Physics, vol. 21, Nos. 6/7, 1982, pp. 467-488.
Fuchs et al., "The SIC Question: History and State of Play," Axioms, vol. 6, No. 21, 2017, 20 pages.
Georgescu et al., "Quantum Simulation," Reviews of Modern Physics, vol. 86, Jan.-Mar. 2014, 33 pages.
Gidofalvi et al., "Molecular Properties from Variational Reduced-Density-Matrix Theory with Three-Particle N-Representability Conditions," The Journal of Chemical Physics, vol. 126, 2007, 7 pages.
Gokhale et al., "Minimizing State Preparations in Variational Quantum Eigensolver by Partitioning into Commuting Families," arXiv:1907v1, Jul. 31, 2019, 23 pages.
Haffner et al., "Quantum Computing with Trapped Ions," Physics Reports, vol. 469, 2008, pp. 155-203.
Hamamura et al., "Efficient Evaluation of Pauli Strings with Entangled Measurements," arXiv:1909v1, Sep. 19, 2019, 15 pages.
Havlicek et al., "Operator Locality in the Quantum Simulation of Fermionic Models," Physical Review A, vol. 95, 2017, 9 pages.
Izmaylov et al., "Unitary Partitioning Approach to the Measurement Problem in the Variational Quantum Eigensolver Method," Journal of Chemical Theory and Computation, vol. 16, 2020, pp. 190-195.
Jena et al., "Pauli Partitioning with Respect to Gate Sets," arXiv:1907v1, Jul. 18, 2019, 7 pages.
Jiang et al., "Quantum Algorithms to Simulate Many-Body Physics of Correlated Fermions," Physical Review Applied, vol. 9, 2018, 23 pages.
Kielpinski et al., "Architecture for a Large-Scale Ion-Trap Quantum Computer," Nature, vol. 417, 2002, 3 pages.
Lloyd, "Universal Quantum Simulators," Science, vol. 273, No. 5278, Aug. 23, 1996, 7 pages.
McClean et al., "Hybrid Quantum-Classical Hierarchy for Mitigation of Decoherence and Determination of Excited States," Physical Review, vol. A 95, No. 042308, 2017, 10 pages.
McClean et al., "Hybrid Quantum-Classical Hierarchy for Mitigation of Decoherence and Determination of Excited States," Physical Review, A vol. 95, 2017, 10 pages.
McClean et al., "The Theory of Variational Hybrid Quantum Classical Algorithms," New Journal of Physics, vol. 18, 2016, 22 pages.
O'Brien et al., "Calculating Energy Derivatives for Quantum Chemistry on a Quantum Computer," arXiv:1905v3, Jul. 17, 2019, 21 pages.
Overy et al., "Unbiased Reduced Density Matrices and Electronic Properties from Full Configuration Interaction Quantum Monte Carlo," The Journal of Chemical Physics, vol. 141, No. 244117, 2014, 12 pages.
Peruzzo et al., "A Variational Eigenvalue Solver on a Photonic Quantum Processor," Nature Communications, 2014, 7 pages.
Rehacek et al., "Minimal Qubit Tomography," Physical Review A vol. 70, 2004, 13 pages.
Rubin et al., "Application of Fermionic Marginal Constraints to Hybrid Quantum Algorithms," New Journal of Physics, vol. 20, 2018, 21 pages.
Seeley et al., "The Bravyi-Kitaev Transformation for Quantum Computation of Electronic Structure," The Journal of Chemical Physics, vol. 137, 2012, 16 pages.
Takeshita et al., Increasing the Representation Accuracy of Quantum Simulations of Chemistry Without Extra Quantum Resources, The American Physical Society, 2020, 9 pages.
Tranter et al., "The Bravyi-Kitaev Transformation: Properties and Applications," International Journal of Quantum Chemistry vol. 115, 2015, pp. 1432-1441.
Verteletskyi et al., "Measurement Optimization in the Variational Quantum Eigensolver Using a Minimum Clique Cover," arXiv:1907.03358 (2019), arXiv:1907v2, Jul. 9, 2019, 6 pages.
Wecker et al., "Solving Strongly Correlated Electron Models on a Quantum Computer," Physical Review, vol. A 92, 2015, 24 pages.
Wendin, "Quantum Information Processing with Superconducting Circuits: A Review," Reports on Progress in Physics. Physical Society (Great Britain), vol. 80, 2017, 50 pages.

* cited by examiner

SYSTEMS AND METHODS FOR QUANTUM TOMOGRAPHY USING AN ANCILLA

PRIORITY CLAIM

The present application is a continuation of U.S. application No. 17/071,316 having a filing date of Oct. 15, 2020, which claims the benefit of priority of U.S. Provisional Application Ser. No. 62/915,246, titled "Systems and Methods for Quantum Tomography Using an Ancilla," filed on Oct. 15, 2019, which is incorporated herein by reference.

FIELD

The present disclosure relates generally to quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively, of a qubit.

SUMMARY

Aspects and advantages of embodiments of the present disclosure will be set forth in part in the following description, or can be learned from the description, or can be learned through practice of the embodiments.

One example aspect of the present disclosure is directed to a quantum computing system. The quantum computing system includes a quantum system having one or more quantum system qubits and one or more ancilla qubits. Each quantum system qubit is associated with one of the one or more ancilla qubits. The quantum computing system includes one or more quantum gates implemented by the quantum computing system. The one or more quantum gates are operable to configure the one or more ancilla qubits into a known state. The quantum computing system includes a quantum measurement circuit implemented by the quantum computing system. The quantum measurement circuit is operable to perform a plurality of measurements on the one or more quantum system qubits using the ancilla qubits. The quantum computing system includes one or more processors operable to perform operations. The operations include determining a reduced density matrix for a subset of the quantum system based on a set of the plurality of measurements. The set of the plurality of measurements include a number of repeated measurements performed on the quantum system qubits using the quantum measurement circuit. The operations include outputting data indicative of the reduced density matrix.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
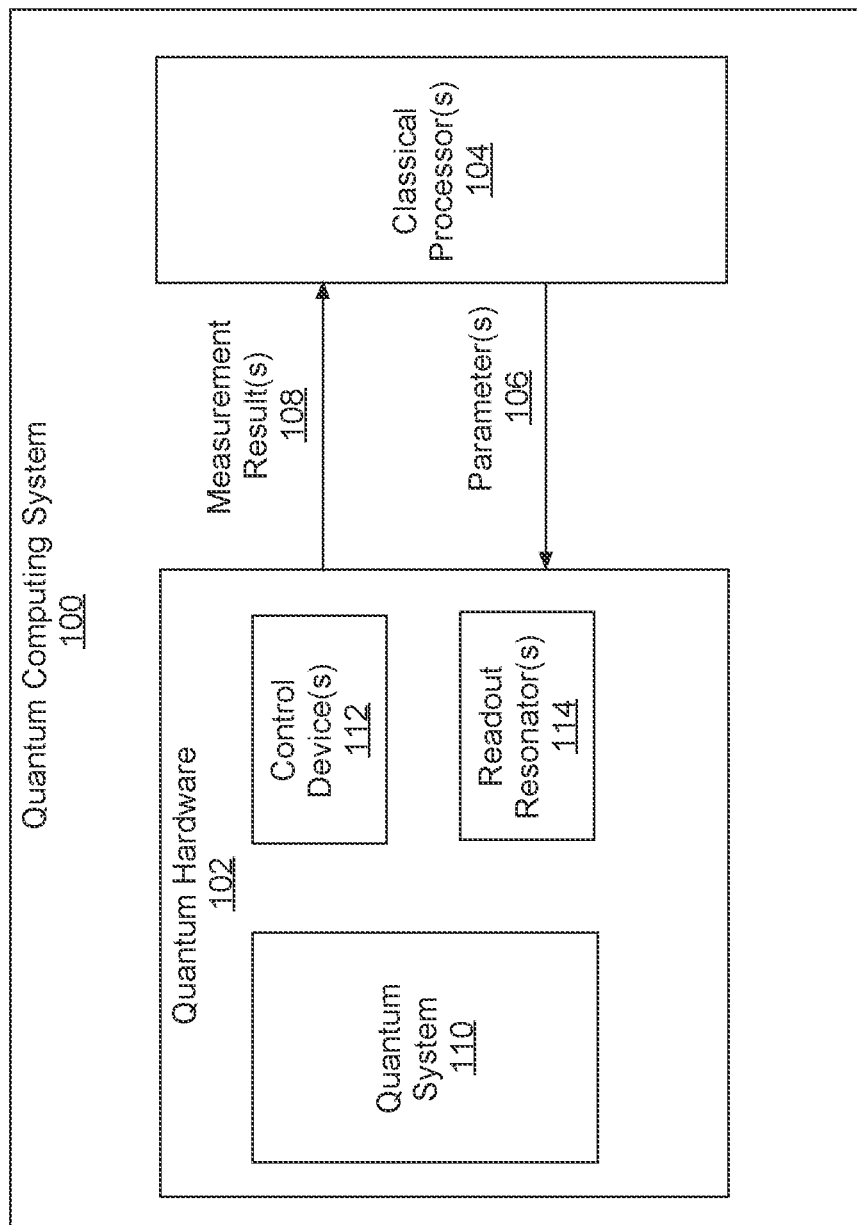
FIG. 1 depicts an example quantum computing system according to example embodiments of the present disclosure.

Example aspects of the present disclosure are directed to quantum computing systems and methods that are operable to determine aspects of a state of a quantum system by performing repeated measurements of the quantum system using a quantum measurement circuit (e.g., a single quantum measurement circuit). In some implementations, reduced density matrix(s) for a quantum system can be determined by performing repeated measurements using the quantum measurement circuit of one or more qubits in the quantum system a specific number of times. In particular aspects, the specific number of repeated measurements can be determined independent of a size (e.g., number of qubits) of the quantum system. The specific number of repeated measurements can scale as a function of desired precision of the reduced density matrix(s). The systems and methods can be applied to the general case of determining aspects of a state of a quantum system having a plurality of qudits. The system and methods can be used to determine elements of fermionic reduced density matrices in fermionic quantum systems.

Reduced density matrices can be used in quantum tomography applications to describe a state of a subset of a quantum system. For instance, a k-qubit reduced density matrix can describe a correlation of k qubits in a quantum system having n total qubits, wherein k is less than n. Determining reduced density matrices from measurement data of a quantum system can be a relevant task when assessing a state of a quantum system using quantum computing systems. For instance, reduced density matrices can provide information regarding correlations between a subset of qubits and/or particles in a quantum system that can allow for computation and/or analysis of various properties of the quantum system, such as monopole moments and derivatives of energy.

According to example aspects of the present disclosure, all elements for all k-qubit reduced density matrices for a quantum system can be determined to a desired precision from a number of repeated measurements performed using a quantum measurement circuit (e.g., a single quantum measurement circuit) on one or more quantum qubits in the quantum system. In particular implementations, the number of repeated measurements can be about $3^k/\in^2$, where k is indicative of a number of qubits in a subset of qubits in the quantum system represented by the k-qubit reduced density matrix and $\in$ is the desired precision (e.g., expresses as a standard deviation). Thus, the number of repeated measurements can be determined irrespective of a total number n of qubits in the quantum system.

More particularly, a quantum system can include one or more quantum system qubits. Aspects of the present disclosure can attach or associate an ancilla qubit with each of the one or more quantum system qubits. Quantum gate(s) implemented in the quantum computing system can configure the ancilla qubits into a known state. A quantum measurement circuit implemented in the quantum computing system can perform a plurality of measurements (e.g., Bell-basis measurements). The measurements can be performed in parallel for each quantum system qubit in the quantum system. For example, the system may comprise a plurality of system qubit-ancilla qubit pairs, and measurements for each system qubit can be performed by analyzing the state of the relevant pair (for example, measuring the pair in the Bell basis). A reduced density matrix associated with a subset of the quantum system (e.g., a k-qubit reduced density matrix for the quantum system having n qubits where k<n) can be determined based on a set of the plurality of measurements. In some embodiments, all k-qubit reduced density matrices for the quantum system (e.g., k-qubit reduced density matrices for all different subsets of k-qubits in the quantum system) can be determined based on the set of the plurality of measurements.

The set of the plurality of measurements can include a number of repeated measurements performed on the quantum system qubits using the quantum measurement circuit. The number of repeated measurements can be determined as a function of the number of qubits (e.g., k) in the subset of the quantum system to be described by the reduced density matrices. In this way, quantum tomography techniques to determine a state of a quantum system using reduced density matrices can be implemented with a single quantum measurement circuit and with a reduced number of repeated measurements independent of quantum system size.

The quantum computing systems and methods according to example aspects of the present disclosure are applicable to the general case of qudits. For instance, a quantum system can have one or more qudits where each qudit has a plurality of quantum levels (e.g., two quantum levels in the case of a qubit, three quantum levels, four quantum levels, and so forth). All elements for all k-qudit reduced density matrices for a quantum system can be determined to a desired precision from a number of repeated measurements performed using a quantum measurement circuit (e.g., a single quantum measurement circuit) on one or more quantum system qudits in the quantum system. In particular implementations, the number of repeated measurements can be about $(D+1)^k/\in^2$, where D is indicative of a number of quantum levels in the qudit(s), k is indicative of a number of qudits in a subset of qubits in the quantum system represented by the k-qudit reduced density matrix, and c is the desired precision. The number of repeated measurements can be determined irrespective of a total number of qudits in the quantum system.

The quantum computing systems and methods according to example aspects of the present disclosure are applicable to determining k-particle fermionic reduced density matrices for a quantum system. Simulating correlated fermionic systems can be a relevant application of quantum computing systems. For instance, estimating the energy of a quantum state can require a partial quantum tomography of two particle fermionic reduced density matrices. Two particle fermionic reduced density matrices can also be used to derive a number of properties of materials. In addition, two-particle reduced density matrices can reduce basis error by relaxing single particle orbitals.

The quantum computing systems and methods according to example aspects of the present disclosure can implement a ternary tree mapping as a fermion-to-qubit mapping. This fermion-to-qubit mapping can provide an optimal and/or enhanced fermion-to-qubit mapping for many quantum computing applications. As one example, all elements for all k-particle fermionic reduced density matrices for a fermionic quantum system can be determined to a desired precision from a number of repeated measurements performed using a quantum measurement circuit (e.g., a single quantum measurement circuit) on one or more quantum system qubits in the quantum system. In particular implementations, the number of repeated measurements can be about $(2n+1)^k/\in^2$, where n is the total number of quantum system qubits in the quantum system, k is indicative of a number of fermionic modes in a subset of the quantum system represented by the k-particle reduced density matrix, and c is the desired precision. The fermion-to-qubit mapping using a ternary tree mapping can be used for other quantum computing applications without deviating from the scope of the present disclosure.

Aspects of the present disclosure can provide a number of technical effects and benefits and can provide improvements to quantum computing technology. For instance, quantum tomography can be more efficiently implemented using a single quantum measurement circuit with a reduced number of repeated measurements irrespective of quantum system size. This can lead to faster determination of reduced density matrices and/or the ability to perform more measurements within a given period of time to achieve increased precision. Moreover, a bottleneck of current quantum computing devices is a low repetition rate which can constrain the number of repeated measurements that can be accurately performed in a given time frame before significant errors are introduced into the system. Aspects of the present disclosure are more readily implemented within the constraints of current quantum devices by requiring fewer repeated measurements using a single quantum measurement circuit. In addition, use of a ternary tree mapping as a quantum With reference now to the FIGS., example embodiments of the present disclosure will be discussed in further detail. As used here, the use of the term "about" in conjunction with a value refers to within 20% of the value.

FIG. 1 depicts an example quantum computing system 100. The example system 100 is an example of a system implemented as classical or quantum computer program on one or more classical computers or quantum computing devices in one or more locations, in which the systems, components, and techniques described below can be implemented. FIG. 1 depicts an example quantum computing system that can be used to implement aspects of the present disclosure. Those of ordinary skill in the art, using the disclosures provided herein, will understand that other quantum computing structures or system can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout resonator(s) 114. The quantum system 110 can include one or more multi-level quantum subsystems, such as a register of qubits. In some implementations, the multi-level quantum subsystems can include superconducting qubits, such as flux qubits, charge qubits, transmon qubits, etc. In some implementations, the multi-level quantum subsystems can include one or more qudits (e.g., units of quantum information described by superposition of D states). In some implementations, the multi-level quantum subsystems can include fermionic quantum subsystems.

The type of multi-level quantum subsystems that the system 100 utilizes may vary. For example, in some cases it may be convenient to include one or more readout resonators 114 attached to one or more superconducting qubits, e.g., transmon, flux, Gmon, Xmon, or other qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits include quantum logic gates or circuits of quantum logic gates, e.g., Hadamard gates, controlled-NOT (CNOT) gates, controlled-phase gates, or T gates. In some implementations, T gates may be stored in one or more T factories included in the quantum hardware 102. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may include one or more digital to analog converters (DACs) with respective voltage physical control parameters.

The quantum hardware 102 may further include measurement devices, e.g., readout resonators 114. Measurement results 108 obtained via measurement devices may be provided to the classical processors 104 for processing and analyzing. In some implementations, the quantum hardware 102 may include a quantum circuit and the control device(s) 112 and readout resonator(s) 114 may include one or more quantum logic gates that operate on the quantum system 102 through microwave pulse physical control parameters that are sent through wires included in the quantum hardware 102. Further examples of control devices include arbitrary waveform generators, wherein a DAC creates the signal. The control parameters may include qubit frequencies.

The readout resonator(s) 114 may be configured to perform quantum measurements on the quantum system 110 and send measurement results 108 to the classical processors 104. In addition, the quantum hardware 102 may be configured to receive data specifying physical control parameter values 106 from the classical processors 104. The quantum hardware 102 may use the received physical control parameter values 106 to update the action of the control device(s) 112 and readout resonator(s) 114 on the quantum system 110. For example, the quantum hardware 102 may receive data specifying new values representing voltage strengths of one or more DACs included in the control devices 112 and may update the action of the DACs on the quantum system 110 accordingly.

The classical processors 104 may be configured to initialize the quantum system 110 in an initial quantum state, e.g., by sending data to the quantum hardware 102 specifying an initial set of parameters 106.

The readout resonator 114 can take advantage of a difference in the impedance for the |0> and |1> states of an element of the quantum system, such as a qubit, to measure the state of the element (e.g., the qubit). For example, the resonance frequency of the readout resonator 114 can take on different values when a qubit is in the state |0> or the state |1>, due to the nonlinearity of the qubit. Therefore, a microwave pulse reflected from the readout resonator 114 carries an amplitude and phase shift that depend on the qubit state. In some implementations, a Purcell filter can be used in conjunction with the readout resonator 114 to impede microwave propagation at the qubit frequency.

Figure 2:
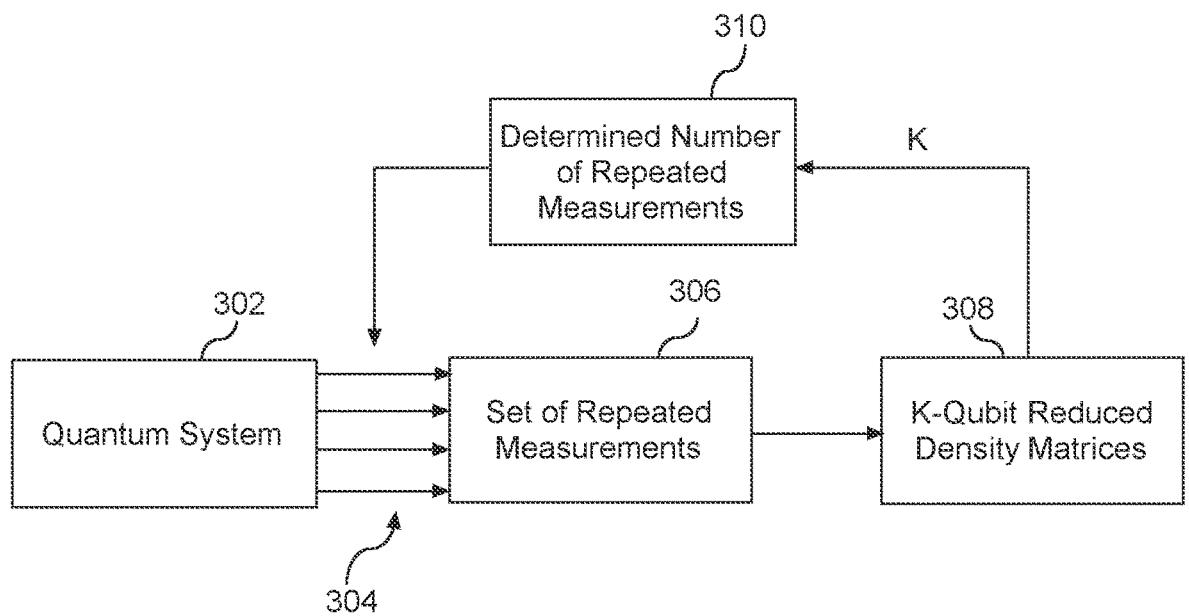
FIG. 2 depicts an overview of determining reduced density matrices for a quantum system according to example embodiments of the present disclosure.

FIG. 2 depicts an overview of determining aspects of a quantum system using reduced density matrices according example aspects of the present disclosure. Given an n-qubit quantum state p the k-qubit reduced density matrix (k-RDM) may be written as:

$$Tr_{\neq j_1,\dots,j_k}(\rho) = \frac{1}{2^k}\sum_{\alpha_1,\dots,\alpha_k=0,x,y,z}\rho_{j_1,\dots,j_k}^{\alpha_1,\dots,\alpha_k}\otimes_{i=1}^k \sigma_{j_i}^{\alpha_i} \qquad (1)$$

where $\sigma_j^\alpha$ is the Pauli operator on the j-th qubit, $\sigma^0$=and $\sigma^{x,y,z}$ are the Pauli-x, -y, and -z operators, respectively. The k-qubit correlation functions in Eq. (1), also referred to as k-RDMs, are defined as $$\rho_{j_1,\dots,j_k}^{\alpha_1,\dots,\alpha_k} = Tr(\rho \otimes_{i=1}^k \sigma_{j_i}^{\alpha_i}). \qquad (2)$$

Measuring the correlation functions for all $\alpha_1, \dots, \alpha_k$ and all $j_1, \dots, j_k$ amounts to determining all k-RDMs. Assuming all (k−1)-RDMs are known, measuring the $(n_k)$ $3^k$ different observables, $\otimes_{i=1}^k \sigma_{j_i}^{\alpha_j}(\alpha_i \neq 0)$, provides the required information to reconstruct all k-RDMs. Under the assumption that only single-qubit operations are allowed, it has been shown that elements in all k-RDMs can be sampled by implementing $e^{O(k)}\log(n)$ different quantum circuits. By repeating each circuit $1/\epsilon^2$ times, the statistical error in estimating these elements scale as $\epsilon$, where $\epsilon$ is precision.

Changing quantum circuits is typically quite slow on certain programmable quantum devices (e.g., those based on FPGAs), while repeating a single circuit may be done much faster. To circumvent the problem of programming various circuits, the quantum computing systems and methods according to example aspects of the present disclosure can allow estimation of elements in all k-qubit RDMs using a single quantum circuit, with error that scales as E by running it for about $3^k/\epsilon^2$ times.

More particularly, as shown in FIG. 2, a state of a quantum system 302 (e.g., one or more qubits in quantum system 110 of FIG. 1) can be determined by performing a plurality of repeated measurements 304 of the quantum system 302 with a quantum measurement circuit. More particularly, an ancilla qubit j' can be associated with each of the one or more quantum system qubits j in the quantum system 302. The ancilla qubit j' can be configured in a known state μ (e.g., using one or more quantum gates), so that the total system-ancilla state is $\rho \otimes \mu^{\otimes n}$. Each pair of qubits j, j' can be measured in the common eigenbasis of $\sigma^x \otimes \sigma^x$, $\sigma^y \otimes \sigma^y$, and $\sigma^z \otimes \sigma^z$, i.e., the Bell basis. The plurality of measurements can be repeated for each pair of qubits j, j' in the quantum system 302 in parallel.

Figure 3:
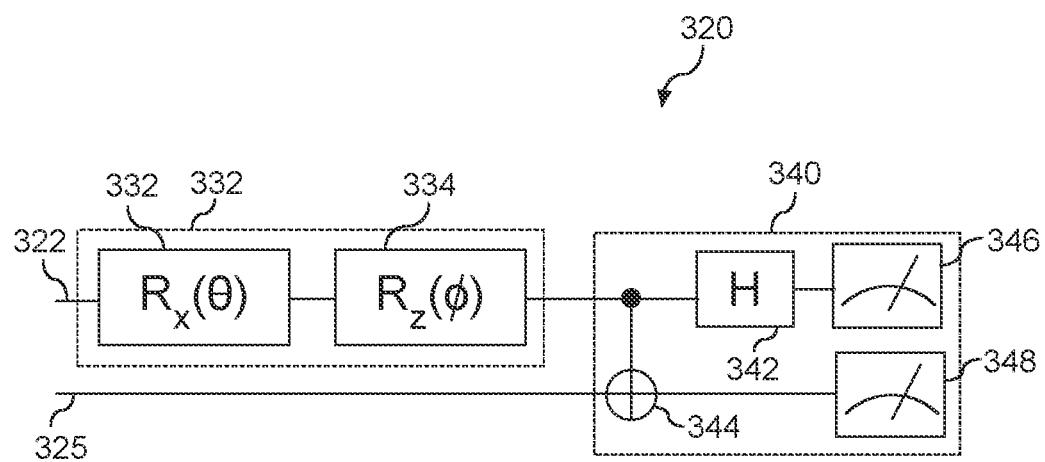
FIG. 3 depicts quantum gates and a quantum measurement circuit according to example embodiments of the present disclosure.

FIG. 3 depicts a wire representation of an example quantum circuit 320 that can be used to perform the plurality of repeated measurements 304. The wire 322 is representative of the ancilla qubit. The wire 325 is representative of the quantum system qubit. As shown, quantum gate(s) 330 can be used to configure the ancilla qubit in a known state μ by rotating |0> about an x axis by an angle θ and a rotation around the z axis by an angle ϕ. Rotation about the x axis can be implemented by quantum gate 332. Rotation about the z axis can be implemented by quantum gate 334. If the Pauli-x, -y, and -z operators are sampled at the same rate, a natural choice of the ancilla state is $$\mu = \frac{1}{2}\left(+\frac{1}{\sqrt{3}}(\sigma^x + \sigma^y + \sigma^z)\right), \quad (3)$$

which leads to $\text{Tr}(\sigma^x \mu)=\text{Tr}(\sigma^y \mu)=\text{Tr}(\sigma^z \mu)=1/\sqrt{3}$. In that regard, in some embodiments, θ is equal to about arccos 1/$\sqrt{3}$ and ϕ is equal to about 3π/4.

The quantum measurement circuit 340 of FIG. 3 can be configured to take Bell-basis measurements of each qubit pair j,j' using Hadamard gate 342 and CNOT gate 344 to provide Bell-basis measurements 346 and 348. Measuring the system and ancilla qubits in the Bell basis yields $$Tr\left(\rho \otimes \mu^{\otimes n} \prod_{i=1}^{k} \sigma_{j_i}^{\alpha_i} \otimes \sigma_{j_i'}^{\alpha_i}\right) = \frac{1}{\sqrt{3}^k} \rho_{j_1,\ldots,j_k}^{\alpha_1,\ldots,\alpha_k}. \quad (4)$$

Due to the factor $1/\sqrt{3}^k$, we must run the experiment about $3^k/\epsilon^2$ times to obtain the standard-deviation error $\epsilon$.

Accordingly, referring back to FIG. 2, all k-qubit reduced density matrices 308 can be determined by processing a set of repeated measurements 306 performed as described with reference to FIG. 3. The set of repeated measurements can be about $3^k/\epsilon^2$, where k is indicative of a number of qubits in the subset of the quantum system represented by the k-qubit reduced density matrix and $\epsilon$ is a desired precision of the k-qubit reduced density matrix.

In some embodiments, the factors k and $\epsilon$ can be obtained (e.g., provided as an input) by the quantum computing system (e.g., as specified parameters). The quantum computing system can automatically determine the number of repeated measurements to be performed on the quantum system as shown at 310 and the quantum computing system can be controlled to perform the number of repeated measurements 304 on the quantum system 302 to determine all k-qubit reduced density matrices for the quantum system.

The scheme for providing a state of a quantum system having one or more qubits described with reference to FIGS. 3 and 4 can be generalized to n-qudit systems. Each qudit can have a D quantum levels (e.g., two levels in the case of a qubit, three quantum levels, etc.). One application is to collection of D-level spin systems.

Consider the Heisenberg-Weyl (HW) shift and phase (clock) operators, $$X|d\rangle = |d \oplus 1\rangle, \quad Z|d\rangle = e^{\frac{2\pi i d}{D}}|d\rangle, \quad (5)$$

$$\text{where } d = 0, \ldots, D-1$$

and $\otimes$ is addition modulo D. The operators obey the HW commutation relation $$XZ = e^{\frac{2\pi i}{D}} ZX.$$

Similarly to the Pauli operators on a qubit, the HW operators generate a complete operator basis acting on the D-dimensional Hilbert space. In particular, a density matrix p of a qubit can be expressed as $$\rho = \frac{1}{D}\left(+\sum_{f \wedge g \neq 0}^{D-1} \rho^{f,g} X^f Z^g\right), \quad (6)$$

$$\text{where } \rho^{f,g} = Tr(Z^{-g} X^{-f} \rho)$$

are the expansion coefficients. Similarly, given an n-qudit density matrix ρ, a k-qudit RDM can be written as $$Tr_{\neq j_1,\ldots,j_k}(\rho) = \frac{1}{D^k}\sum_{f_1,g_1\ldots,f_k,g_k=0}^{D-1} \rho_{j_1,\ldots,j_k}^{f_1 g_1,\ldots,f_k g_k} \otimes_{i=1}^{k} X_{j_i}^{f_i} Z_{j_i}^{g_i}, \quad (7)$$

where $X_{j_i}^{f_i} Z_{j_i}^{g_i}$ are the HW operators on the $j_i$-th qudit, and $$\rho_{j_1,\ldots,j_k}^{f_1 g_1,\ldots,f_k g_k} = Tr\left(\rho \otimes_{i=1}^{k} X_{j_i}^{f_i} Z_{j_i}^{g_i}\right), \quad (8)$$

By measuring the above correlation functions for all $f_1$, $h_1$ ... $f_k$, $h_k$ and all $j_1, \ldots j_k$ we can determine all k-qudit RDMs.

While the HW operators on a qudit are not commute or anticommute as the Pauli operators on a qubit, nevertheless, all the required correlation functions can be measured with a single quantum circuit according to example aspects of the present disclosure. Consider the generalization of the Bell-basis to qudits, $$|\Phi_{h\ell}\rangle = \bigotimes X^h Z^\ell |\Phi_{00}\rangle = Z^\ell X^{-h} \otimes |\Phi_{00}\rangle, \quad (9)$$

where $$|\Phi_{00}\rangle = \frac{1}{\sqrt{D}}\sum_{d=0}^{D-1} |d\rangle \otimes |d\rangle. \quad (10)$$

Following the HW commutation relation we obtain, $$\langle \Phi_{h\ell} | \Phi_{h'\ell'}\rangle = \langle \Phi_{00}|1 \otimes (X^h Z^\ell)^+ X^{h'} Z^{\ell'}|\Phi_{00}\rangle \quad (11)$$

$$= \delta_{\ell,\ell'}\delta_{h,h'}, \quad (12)$$

where the $\delta_{\ell,\ell'}=1$ $\ell$ $\ell'$ and $\delta_{\ell,\ell'}=0$ otherwise (and similarly for $\delta_{h,h'}$). Therefore, the set $\{|\Phi_{h'\ell'}\rangle: h, \ell =0, \ldots, D-1\}$ form an orthonormal basis for two qudits. It is the eigenbasis of the operators $X^f Z^g \otimes X^f Z^{-g}$ for f, g=0, . . . , D–1, $$X^f Z^g \otimes X^f Z^{-g} | \Phi_{h\ell} \rangle = e^{2\pi i (gh - f\ell)/D} | \Phi_{h\ell} \rangle. \quad (13)$$

Hence, measuring these mutually-commuting operators in the generalized Bell basis (e.g., equation (9)) reveals their values simultaneously.

Similar to the qubit case, one can estimate elements in all k-qudit RDMs with error $\epsilon$ by repeating the following steps for $(D+1)^k/\epsilon^2$ times: (1) to each system qudit (labeled by j) attach an ancillary qudit (labelled by j') in a known state $\mu$, so that the total system-ancilla state is $\rho \otimes \mu^{\otimes n}$; (2) measure each pair of qudits (j,j') in the common eigenbasis of $X^f Z^g \otimes X^f Z^{-g}$, i.e., the generalized Bell basis.

By choosing a qudit ancilla state $\mu$ such that $$Tr\left(X_{j_i}^{f_i} Z_{j_i}^{-g_i} \mu\right) = \frac{1}{\sqrt{D+1}}, \quad (14)$$

the following is obtained:

$$\rho_{j_1, \ldots, j_k}^{f_1 g_1, \ldots, f_k g_k} = \frac{Tr\left(\rho \otimes \mu^{\otimes n} \prod_{i=1}^{k} X_{j_i}^{f_i} Z_{j_i}^{g_i} \otimes X_{j_i'}^{f_i} Z_{j_i'}^{-g_i}\right)}{\sqrt{D+1}^k}. \quad (15)$$

The last equation implies that to obtain a fixed standard-deviation error $\epsilon$ in the measured quantities, the number of repeated measurements is about $(D+1)^k/\epsilon^2$ times.

The quantum computing systems and methods described above can also be applied to fermionic quantum systems. One way to estimate the energy of a quantum state in a variational quantum algorithm is by measuring a set of observables that include the fermionic k-particle reduced density matrix. The fermionic k-particle reduced density matrix can include $\mathcal{O}(n^{2k})$ parameters, from which a large number of properties of a quantum system can be determined. Determining elements in the reduced density matrices also allows one to implement error mitigation schemes based on subspace expansions.

In the second quantization formalism, the elements in a k-particle reduced density matrix of an n-mode fermionic system are expectation values involving 2k fermionic operators. For instance, the fermionic 2-reduced density matrix may be written as $$\rho_{pqrs} = \langle \gamma_p \gamma_q \gamma_r \gamma_s \rangle, \quad (16)$$

where the $\gamma$'s are the Majorana fermion operators $$\gamma_{2j} = \frac{1}{\sqrt{2}}(c_j^\dagger + c_j), \quad \gamma_{2j+1} = \frac{i}{\sqrt{2}}(c_j^\dagger - ic_j), \quad (17)$$

for j=1,2, . . . , n. The 2n Majorana operators mutually anticommute, i.e., $\{\gamma_p, \gamma_q\} = 0$ for $p \neq q$.

There are various ways to map fermionic operators to qubit operators. The Jordan-Wigner transformation (JWT) maps single fermionic operators to qubit operators acting on $\mathcal{O}(n)$ qubits. In comparison, the Bravyi-Kitaev transformation (BKT) reduces that number to $\mathcal{O}(\log n)$ qubits. The three Pauli operators are neither balanced in the JWT or BKT, as the Pauli-z operators are used more frequently in the JWT, while the Pauli-x and -z operators are used more often in the BKT.

Example aspects of the present disclosure implement a fermion-to-qubit mapping that maps single fermionic operators to qubit operators with balanced numbers of Pauli-x, -y, and -z operators. For instance, the fermion-to-qubit mapping can be defined on a ternary tree, where a qubit is put on each node of the tree that is not a leaf. The tree can be complete, i.e., all levels can be fully filled. The total number of qubits, i.e., nodes excluding the leaves, in a ternary tree of height h is $$n = \sum_{\ell=0}^{h-1} 3^\ell = \frac{3^h - 1}{2}. \quad (18)$$

Figure 4:
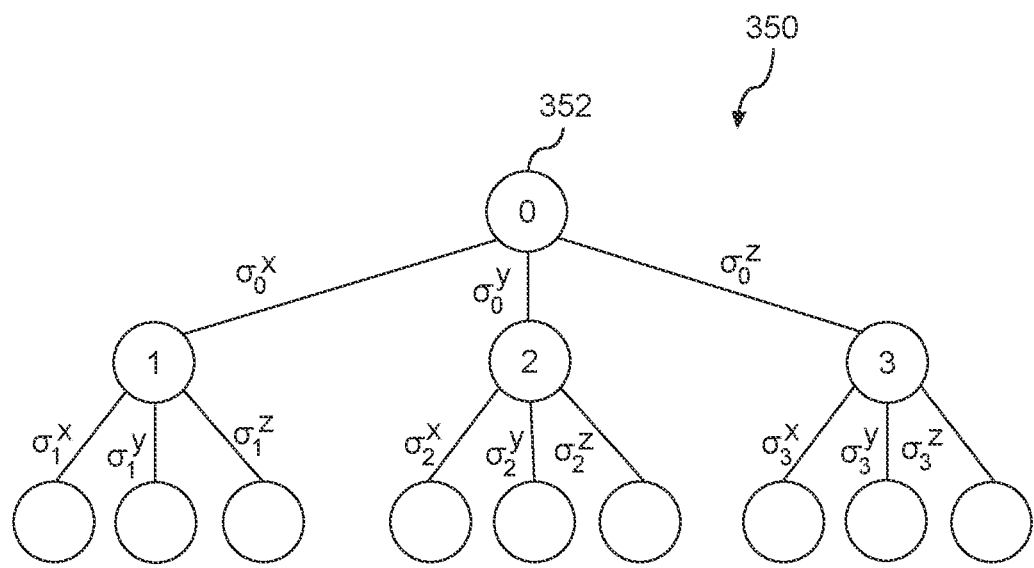
FIG. 4 an example fermion-to-qubit mapping according to example embodiments of the present disclosure.

FIG. 4 depicts a ternary tree mapping used to implement a fermion-to-qubit mapping 350 according to example embodiments of the present disclosure. The qubit associated with the root node 352 is labeled 0. The rest of the qubits are indexed consecutively going down the tree as shown in FIG. 4. The Pauli operators of the η-th qubit are denoted as $\sigma_\eta^{x,y,z}$. Each root-to-leaf path on the tree can be uniquely specified by the vector $p=(p_0, \ldots, p_{h-1})$, where $p_\ell = 0, 1, 2$ determines the next node on the path with depth $\ell +1$ based on the current node with depth $\ell$. The index of a node of depth $\ell$ on the path p can be written by $$\eta(p, \ell) = (3^\ell - 1)/2 + \sum_{j=0}^{\ell-1} 3^{\ell-j} p_j, \text{ for } \ell > 0, \quad (19)$$

where $(3^\ell - 1)/2$ is the number of nodes with depth less than $\ell$. An operator for each root-to-leaf path p can be introduced:

$$A_\mathbf{p} = \prod_{\ell=0}^{h-1} \sigma_{\eta(\mathbf{p}, \ell)}^{\chi(p_\ell)}, A_p^2 =, \quad (20)$$

where $\chi(p) = x, y, z$ for p=0, 1, 2, respectively. By construction these operators are mutually anticommute, i.e., $\{A_p, A_q\} = $ for $p \neq q$. This is because p and q have to diverge at some point. Before that point they involve the same Pauli operators on the same qubits, at the point of divergence $A_p$ and $A_q$ associate different Pauli operator to the same qubit, whereas after that point they involve Pauli operators on different qubits.

There are $3^h = 2n+1$ distinct root-to-leaf paths in the ternary tree, whereas the total number of independent operators $A_p$ is 2n. This is because the product of $A_p$ for all paths p is proportional to the identity operator. Therefore, 2n Majorana operators can be mapped to 2n independent Pauli operators $A_p$ with the same anticommutation relations. The Pauli weight of $A_p$ equals to the tree height $h = \log_3(2n+1)$, which is lower than $\log_2(n+1)$ in the BKT. As a result, the Pauli weights of elements in fermionic k-RDMs are at most $2k \log_3(2n+1)$. Using quantum measurement according to example aspects of the present disclosure, the matrix elements can be attenuated by a factor bounded by $$\sqrt{3}^{2k\log_3(2n+1)} = (2n+1)^k. \quad (21)$$

Therefore, all fermionic k-RDMs can be measured to precision $\epsilon$ by repeating the same circuit according to example aspects of the present disclosure for about $(2n+1)^k/\epsilon^2$ times.

Figure 5:
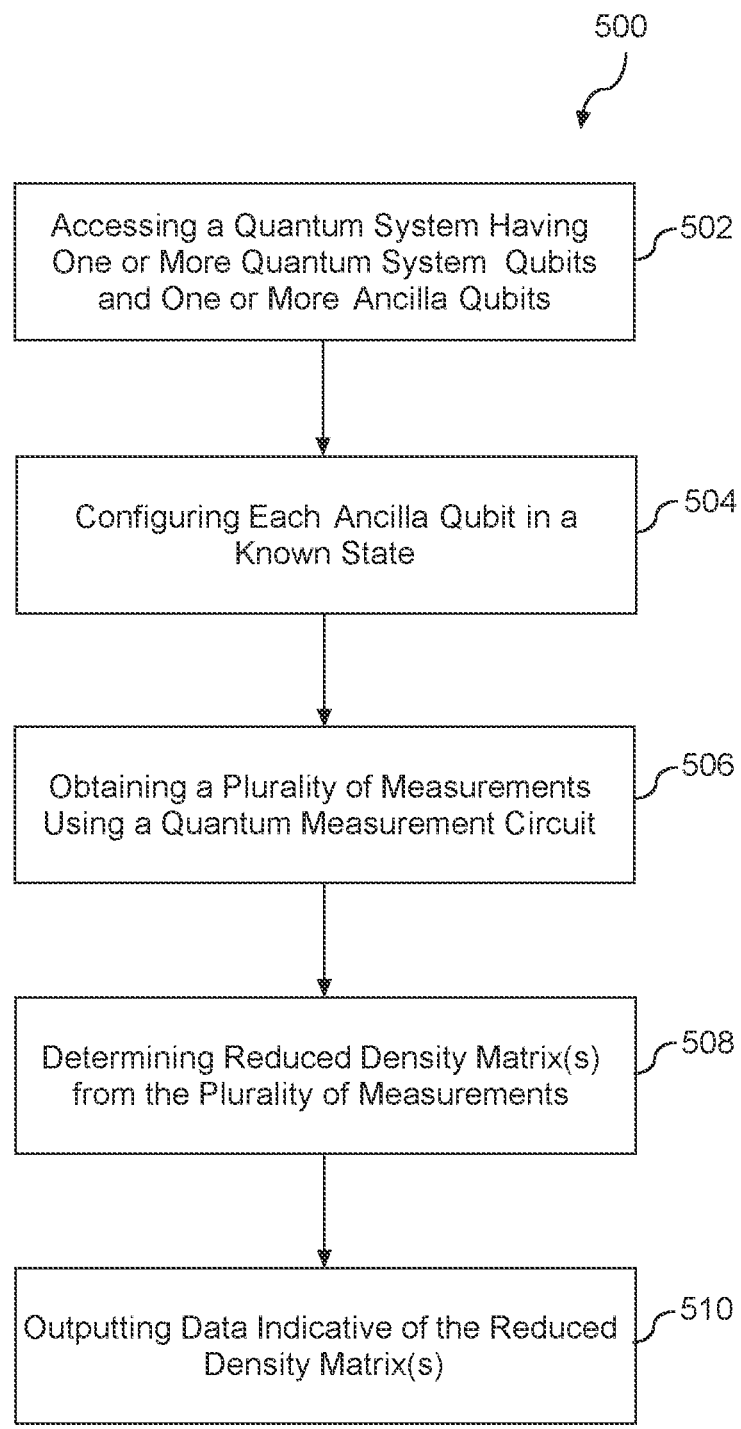
FIG. 5 depicts a flow diagram of an example method according to example embodiments of the present disclosure.

FIG. 5 depicts a flow diagram of an example method 500 according to example embodiments of the present disclosure. The method 500 can be implemented using any suitable quantum computing system, such as the quantum computing system 100 depicted in FIG. 1. FIG. 5 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At 502, the method can include accessing a quantum system (e.g., the quantum system 102 of FIG. 1). The quantum system can include one or more quantum system qubits. The quantum system can include one or more ancilla qubits. Each ancilla qubit can be associated with one of the one or more quantum system qubits.

At 504, the method can including configuring each ancilla qubit in a known state. For instance, as discussed with reference to FIGS. 2 and 3, quantum gate(s) implemented by a quantum computing system can configure each ancilla qubit in the quantum system in a known state. For the case of qubits, each ancilla qubit can be configured in a known state $\mu$ (e.g., using one or more quantum gates), so that the total system-ancilla state is $\rho \otimes \mu^{\otimes n}$.

In some embodiments, the ancilla qubit can be configured in a known state $\mu$ by rotating $|0\rangle$ about an x axis by an angle $\theta$ followed by a rotation around the z axis by an angle $\phi$. If the Pauli-x, -y, and -z operators are sampled at the same rate, a natural choice of the ancilla state is $$\mu = \frac{1}{2}\left( + \frac{1}{\sqrt{3}}(\sigma^x + \sigma^y + \sigma^z) \right), \quad (3)$$

which leads to $Tr(\sigma^x\mu)=Tr(\sigma^y\mu)=Tr(\sigma^z\mu)=1/\sqrt{3}$. In that regard, in some embodiments, $\theta$ is equal to about arccos $1/\sqrt{3}$ and $\phi$ is equal to about $3\pi/4$.

At 506 of FIG. 5, the method can include obtaining a plurality of measurements (e.g., Bell-basis measurements) using a quantum measurement circuit. The plurality of measurements can be performed, for instance, using the quantum circuit 320 depicted in FIG. 3. The plurality of measurements can be repeated a specific number of times. Measurements for each qubit and ancilla qubit pair in the quantum system can be performed in parallel with the quantum measurement circuit.

At 508, the method can include determining reduced density matrix(s) from a set of the plurality of measurements. For instance, the classical processor(s) 104 of FIG. 1 can determine reduce density matrix(s) from a set of the plurality of measurements. The set of plurality of measurements can include a number of repeated measurements performed on the quantum system In some embodiments, the reduced density matrix(s) can include all k-qubit reduced density matrices for the quantum system. The number of repeated measurements can be determined as a function of a size of the subset of the quantum system described by the reduced density matrix irrespective of a number of quantum system qubits in the quantum system. The number of repeated measurements can be about $3^k/\epsilon^2$, where k is indicative of a number of qubits in the subset of the quantum system represented by the k-qubit reduced density matrix and $\epsilon$ is a desired precision of the k-qubit reduced density matrix.

At 510, the method can include outputting data indicative of the reduced density matrix(s). For example, the data indicative of the reduced density matrix(s) can be communicated to another component of the quantum computing system (e.g., another processor) or to a remote device. As another example, data indicative of the reduced density matrix(s) can be stored in one or more memory devices. As another example, data indicative of the reduced density matrix(s) can be provided for display on one or more display devices. As another example, data indicative of the reduced density matrix(s) can be provided for access by one or more computer programs, modules, executable instructions, or the like.

Figure 6:
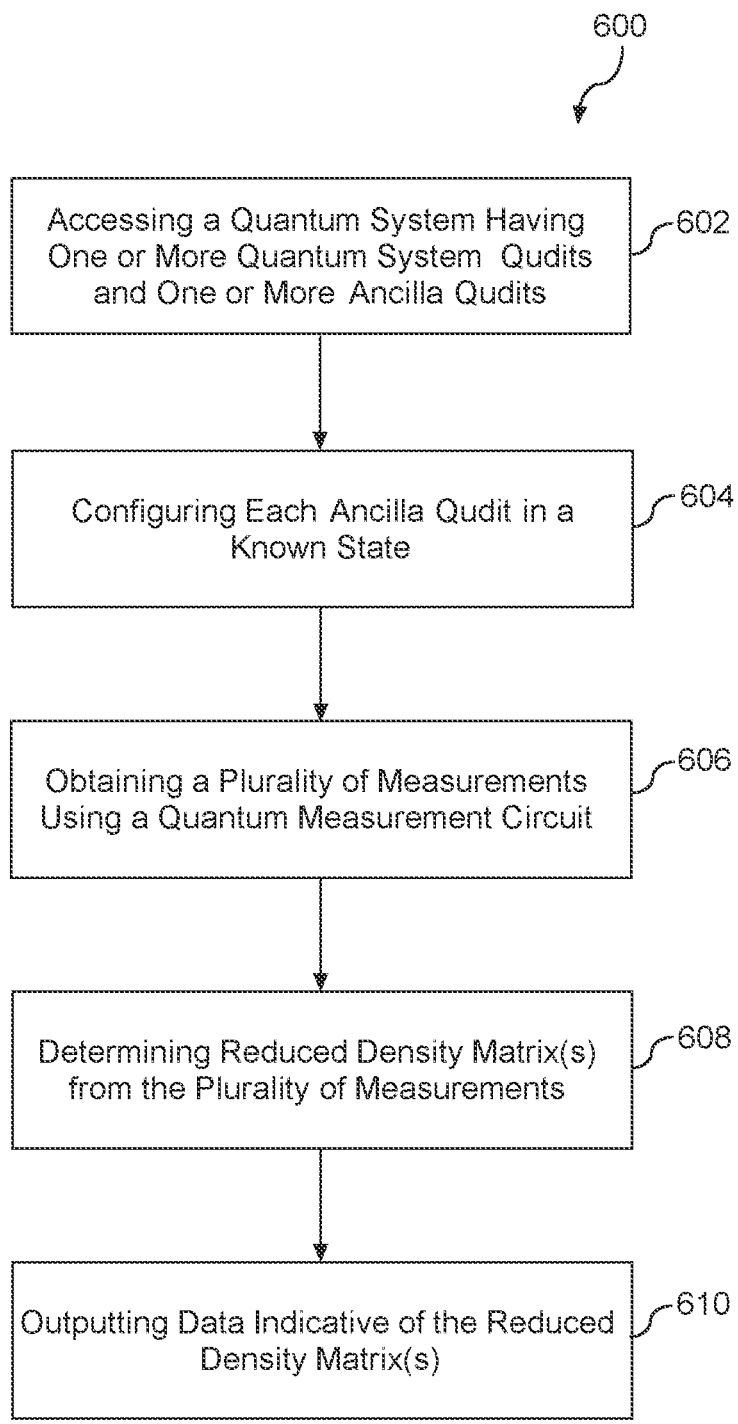
FIG. 6 depicts a flow diagram of an example method according to example embodiments of the present disclosure.

FIG. 6 depicts a flow diagram of an example method 600 according to example embodiments of the present disclosure. The method 600 can be implemented using any suitable quantum computing system, such as the quantum computing system 100 depicted in FIG. 1. FIG. 6 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At 602, the method can include accessing a quantum system (e.g., the quantum system 102 of FIG. 1). The quantum system can include one or more quantum system qudits. The quantum system can include one or more ancilla qudits. Each ancilla qudit can be associated with one of the one or more quantum system qudits. Each qudit can be associated with a plurality of quantum levels. For instance, each qudit can be associated with D quantum levels.

At 604, the method can including configuring each ancilla qudit in a known state. For instance, quantum gate(s) implemented by a quantum computing system can configure each ancilla qudit in the quantum system in a known state. For the case of qudits, each ancilla qudit can be configured in a known state $\mu$ as described with reference to equations (13) and (14) above.

At 606, the method can include obtaining a plurality of measurements (e.g., Bell-basis measurements) using a quantum measurement circuit. The plurality of measurements can be repeated a specific number of times. Measurements for each qudit and ancilla qudit pair in the quantum system can be performed in parallel with the quantum measurement circuit.

At 608, the method can include determining reduced density matrix(s) from a set of the plurality of measurements. For instance, the classical processor(s) 104 of FIG. 1 can determine reduce density matrix(s) from a set of the plurality of measurements. The set of plurality of measurements can include a number of repeated measurements performed on the quantum system. In some embodiments, the reduced density matrix(s) can include all k-qudit reduced density matrices for the quantum system. The number of repeated measurements can be determined as a function of a size of the subset of the quantum system described by the reduced density matrix irrespective of a number of quantum system qudits in the quantum system. The number of repeated measurements can be about $(D+1)^k/\epsilon^2$, where D is the number of quantum levels associated with each qudit, k is indicative of a number of qudits in the subset of the quantum system represented by the k-qudit reduced density matrix, and $\epsilon$ is a desired precision of the k-qudit reduced density matrix.

At 610, the method can include outputting data indicative of the reduced density matrix(s). For example, the data indicative of the reduced density matrix(s) can be communicated to another component of the quantum computing system (e.g., another processor) or to a remote device. As another example, data indicative of the reduced density matrix(s) can be stored in one or more memory devices. As another example, data indicative of the reduced density matrix(s) can be provided for display on one or more display devices. As another example, data indicative of the reduced density matrix(s) can be provided for access by one or more computer programs, modules, executable instructions, or the like.

Figure 7:
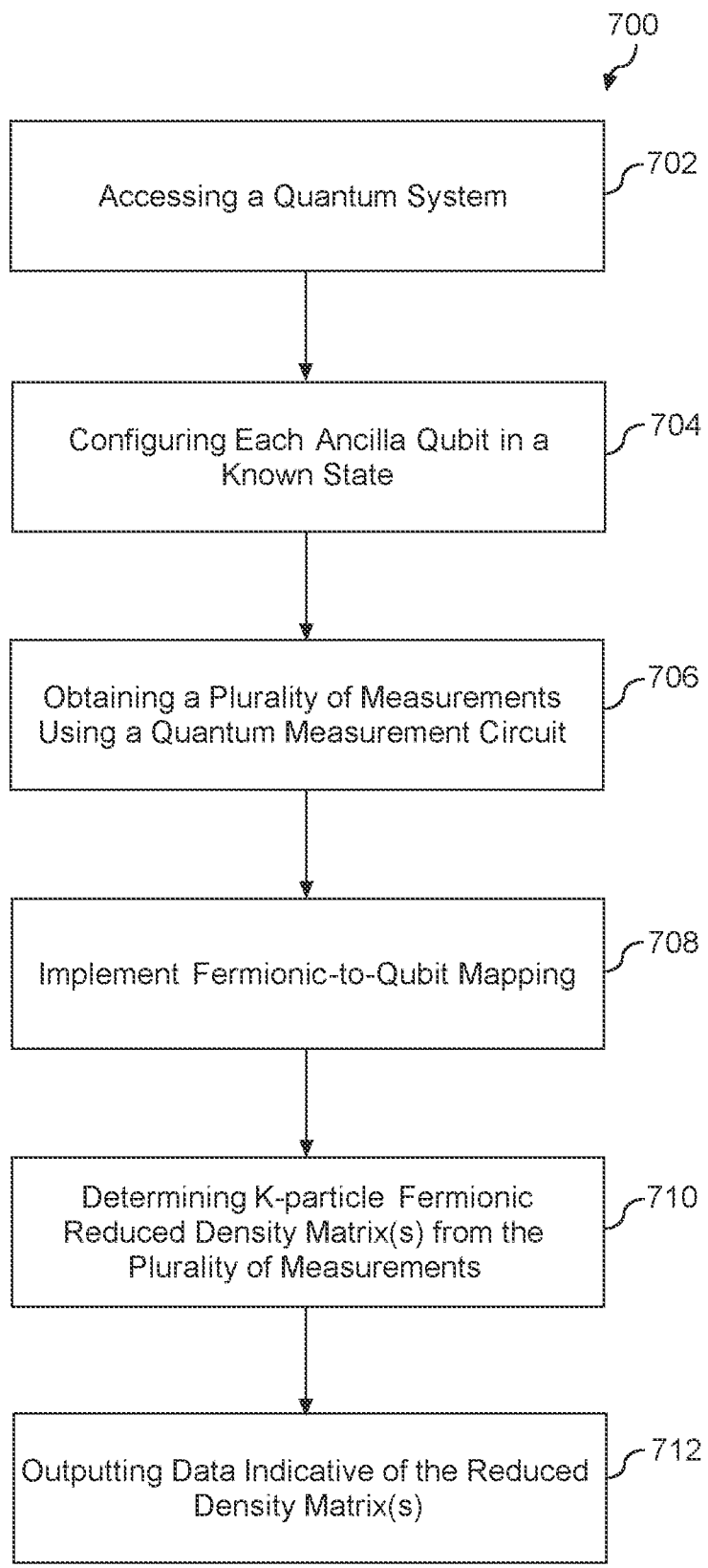
FIG. 7 depicts a flow diagram of an example method according to example embodiments of the present disclosure.

FIG. 7 depicts a flow diagram of an example method 700 according to example embodiments of the present disclosure. The method 700 can be implemented using any suitable quantum computing system, such as the quantum computing system 100 depicted in FIG. 1. FIG. 7 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At 702, the method can include accessing a quantum system (e.g., the quantum system 102 of FIG. 1). The quantum system can include one or more quantum system qubits. The quantum system can include one or more ancilla qubits. Each ancilla qubit can be associated with one of the one or more quantum system qubits.

At 704, the method can including configuring each ancilla qubit in a known state. For instance, as discussed with reference to FIGS. 3 and 4, quantum gate(s) implemented by a quantum computing system can configure each ancilla qubit in the quantum system in a known state. For the case of qubits, each ancilla qubit can be configured in a known state $\mu$ (e.g., using one or more quantum gates), so that the total system-ancilla state is $\rho \otimes \mu^{\otimes n}$.

In some embodiments, the ancilla qubit can be configured in a known state $\mu$ by rotating |0> about an x axis by an angle $\theta$ and a rotation around the z axis by an angle $\rho$. If the Pauli-x, -y, and -z operators are sampled at the same rate, a natural choice of the ancilla state is $$\mu = \frac{1}{2}\left(+\frac{1}{\sqrt{3}}(\sigma^x + \sigma^y + \sigma^z)\right), \quad (3)$$

which leads to $Tr(\sigma^x\mu)=Tr(\sigma^y\mu)=Tr(\sigma^z\mu)=1/\sqrt{3}$. In that regard, in some embodiments, $\theta$ is equal to about arccos (1/$\sqrt{3}$) and $\phi$ is equal to about $3\pi/4$.

At 706, the method can include obtaining a plurality of measurements (e.g., Bell-basis measurements) using a quantum measurement circuit. The plurality of measurements can be performed, for instance, using the quantum circuit 320 depicted in FIG. 3. The plurality of measurements can be repeated a specific number of times. Measurements for each qubit and ancilla qubit pair in the quantum system can be performed in parallel with the quantum measurement circuit.

At 708, the method can include implementing a fermionic-to-qubit mapping. An example fermionic-to-qubit mapping is a ternary tree mapping as discussed above with reference to FIG. 4. In the this mapping, there are $3^h=2n+1$ distinct root-to-leaf paths in the ternary tree, whereas the total number of independent operators $A_p$ is 2n. This is because the product of $A_p$ for all paths p is proportional to the identity operator. Therefore, 2n Majorana operators can be mapped to 2n independent Pauli operators $A_p$ with the same anticommutation relations. The Pauli weight of $A_p$ equals to the tree height $h=\log_3(2n+1)$, which is lower than $\log_2 (n+1)$ in the BKT. As a result, the Pauli weights of elements in fermionic k-RDMs are at most $2k\log_3(2n+1)$.

At 710, the method can include determining reduced density matrix(s) from a set of the plurality of measurements. For instance, the classical processor(s) 104 of FIG. 1 can determine reduce density matrix(s) from a set of the plurality of measurements. The set of plurality of measurements can include a number of repeated measurements performed on the quantum system In some embodiments, the reduced density matrix(s) can include all k-particle fermionic reduced density matrices for the fermionic quantum system. The number of repeated measurements can be about $(2n+1)k/\epsilon^2$, wherein n is a number of quantum system qubits, k is indicative of a number of particles in the subset of the quantum system represented by the reduced density matrix, and E is a defined precision At 712, the method can include outputting data indicative of the reduced density matrix(s). For example, the data indicative of the reduced density matrix(s) can be communicated to another component of the quantum computing system (e.g., another processor) or to a remote device. As another example, data indicative of the reduced density matrix(s) can be stored in one or more memory devices. As another example, data indicative of the reduced density matrix(s) can be provided for display on one or more display devices. As another example, data indicative of the reduced density matrix(s) can be provided for access by one or more computer programs, modules, executable instructions, or the like.

Implementations of the digital and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc..

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, the method comprising implementing, by one or more computing devices, a fermionic-to-qubit mapping using a ternary tree mapping, the ternary tree mapping maps a single fermionic operator to a qubit operator with a balanced number of Pauli-x, -y- and -z operators.

2. The method of claim 1, wherein the method comprises determining a k-particle fermionic reduced density matrix based at least in part on the ternary tree mapping.

3. The method of claim 2, wherein determining the k-particle fermionic reduced density matrix comprises performing a number of repeated measurements on one or more qubits using a quantum measurement circuit.

4. The method of claim 3, wherein the number of repeated measurements is determined based on a total number of quantum system qubits in a quantum system, a number of fermionic modes in a subset of the quantum system represented by the k-particle reduced density matrix, and a desired precision.

5. The method of claim 1, wherein the ternary tree comprises a plurality of first nodes and a plurality of second nodes, wherein the second nodes are leaf nodes of the ternary tree.

6. The method of claim 5, wherein each of the first nodes are associated with a qubit.

7. The method of claim 5, wherein the second nodes are not associated with a qubit.

8. The method of claim 1, wherein there are $3^h=2n+1$ distinct root-to-leaf paths in the ternary tree, wherein h is the height of the ternary tree, where n is a number of qubits in the fermionic-to-qubit mapping.

9. The method of claim 1, wherein the Pauli weights of elements in fermionic k-particle reduced density matrices are logarithmic based on a number of qubits in the fermionic-to-qubit mapping.

10. The method of claim 9, the Pauli weights of elements in fermionic k-particle reduced density matrices are no more than $2k\log_3(2n-1)$, where n is a number of qubits in the fermionic-to-qubit mapping.

11. A quantum computing system, comprising
one or more qubits; and
one or more processors operable to perform operations, the operations comprising implementing a fermionic-to-qubit mapping using a ternary tree mapping;
determining a k-particle fermionic reduced density matrix based at least in part on the ternary tree mapping.

12. The quantum computing system of claim 11, wherein determining the k-particle fermionic reduced density matrix comprises performing a number of repeated measurements on one or more qubits using a quantum measurement circuit.

13. The quantum computing system of claim 12, wherein the number of repeated measurements is determined based on a total number of quantum system qubits in a quantum system, a number of fermionic modes in a subset of the quantum system represented by the k-particle reduced density matrix, and a desired precision.

14. The quantum computing system of claim 11, wherein each of the first nodes are associated with a qubit.

15. The quantum computing system of claim 11, wherein the second nodes are not associated with a qubit.

16. The quantum computing system of claim 11, wherein there are $3^h=2n+1$ distinct root-to-leaf paths in the ternary tree, wherein h is the height of the ternary tree, where n is a number of qubits in the fermionic-to-qubit mapping.

17. The quantum computing system of claim 11, wherein the Pauli weights of elements in fermionic k-particle reduced density matrices are logarithmic based on a number of qubits in the fermionic-to-qubit mapping.

\* \* \* \* \*